P. EDTBAUER.
AUTOMATIC WEIGHING APPARATUS.
APPLICATION FILED JUNE 7, 1912.
1,074,611.
Patented Oct. 7, 1913.
2 SHEETS—SHEET 1.
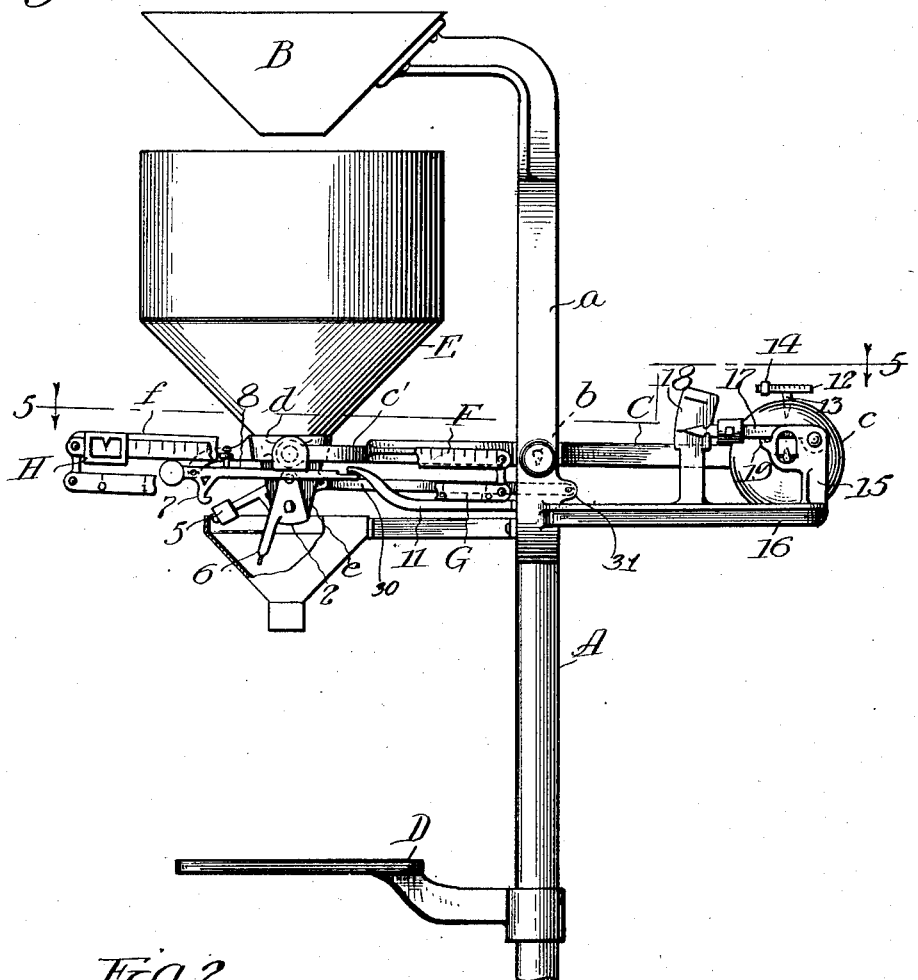
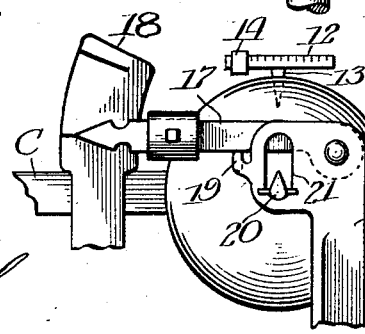
Witnesses
O. M. Wernich
E. K. Lundy
Inventor
Petronella Edtbauer
by Frank D. Thomason
Atty.

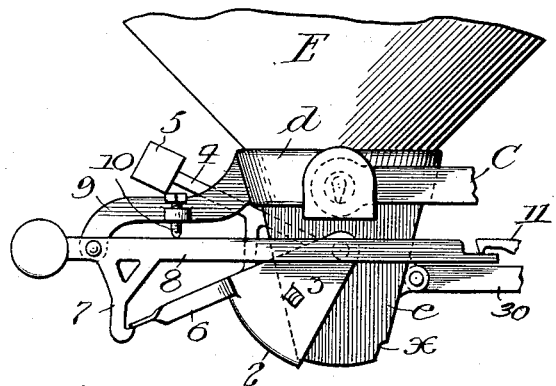
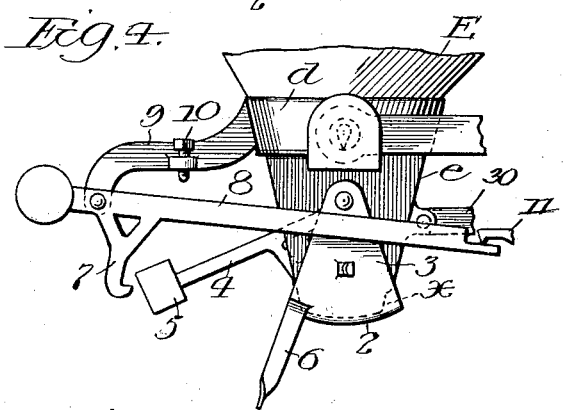
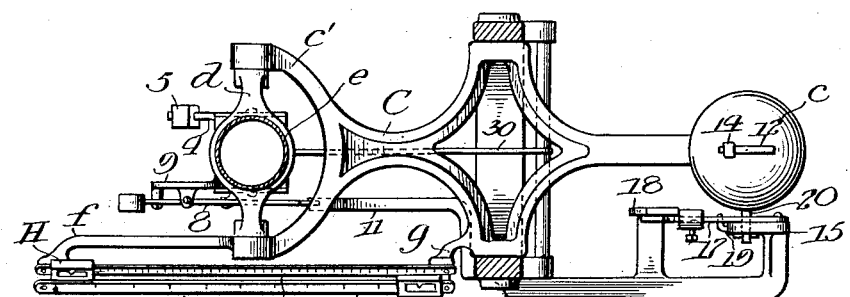

UNITED STATES PATENT OFFICE.

PETRONELLA EDTBAUER, OF CHICAGO, ILLINOIS.

AUTOMATIC WEIGHING APPARATUS.

1,074,611.  Specification of Letters Patent.  Patented Oct. 7, 1913.

Application filed June 7, 1912. Serial No. 702,184.

*To all whom it may concern:*

Be it known that I, PETRONELLA EDT-BAUER, a citizen of the United States, residing at Chicago, in the county of Cook and State of Illinois, have invented new and useful Improvements in Automatic Weighing Apparatus, of which the following is a full, clear, and exact description.

My invention relates to measuring scales that are particularly adapted for weighing food stuffs and products usually sold by retail and wholesale grocers.

The principal object of my invention is to weigh products such as coffee, tea, sugar, etc., by first supplying an excess thereof to the pan or receptacle of the scales, and then allowing the surplus or excess over and above the weight of the commodity it is desired to obtain to escape.

A further object is to automatically prevent the further escape of the commodity from the pan of the scale after said excess has been removed, and another object is to provide adjusting devices by means of which allowance may be made for the friction resisting the prompt action of the various movable parts of my invention, and yet another object is to determine the weight it is desired to obtain, by adjustments that decrease the leverage of the arm of the beam supporting the pan, and then increasing said leverage by an overweight therein, and then decreasing said leverage to the degree necessary to obtain the proper balance of the beam.

These and other objects I accomplish by the means hereinafter more fully described and as particularly pointed out in the claims.

In the drawings: Figure 1 is a side elevation of my invention and the upper part of the supporting-frame therefor. Fig. 2 is a fragmentary view of my invention showing the counterbalance of the beam of the scales and co-acting devices, drawn to a larger scale. Figs. 3 and 4 are fragmentary views of the mechanism adjacent to and coöperating with the discharge end of the pan of the scales showing, diagrammatically, the operation of said devices. Fig. 5 is a horizontal section of my invention taken on dotted line 5, 5, Fig. 1, and drawn to the same scale thereas.

Referring to the drawings, A represents a suitable metallic standard, the top of which is bent laterally and has secured thereto, in any suitable manner, an inverted truncated hopper B. A short distance below its upper end this standard is so constructed as to provide a vertically elongated open oblong frame $a$, the vertical members of which near the lower ends thereof are provided with suitable bearings for the knife-edge trunnions $b$, of the beam C of the scale, and at a convenient position below the beam C and other elements and devices of the weighing mechanism, the standard A has a platform D secured thereto and projecting therefrom in the same direction as its upper bent end. The beam C is wider and is journaled at its center of length, as near as practicable, and its right hand branch consists of a straight longitudinal bar which is provided with a spherical weight $c$. The end of its left hand branch is bifurcated, substantially as shown in the drawings, and the resulting corresponding bifurcations $c'$ are provided with bearings in their extremities for a yoke $d$, and the center of length of this yoke is made into a circular seat in which the discharge tube $e$ of the funnel-shaped weighing pan or receptacle E is placed. One of the bifurcations $c'$ is provided with a longitudinal extension $f$, the end of which is bent forward and provided with a downwardly inclined face, to which is secured one end of a graduated longitudinally disposed bar F, and just below it one end of a parallel graduated bar G. These bars are suitably spaced apart and their opposite ends terminate adjacent the standard, where they are independently secured to an arm $g$, projecting from the widened central portion of beam C near the center bearings thereof. These graduated bars F and G are each provided with longitudinally slidable weights H and $h$, respectively, and it is by adjusting these weights longitudinally that the exact measurement or weight of the commodity in the receptacle E is ascertained.

When it is desired to obtain a given weight of any commodity, a quantity of the same is poured into the receptacle E exceeding the weight desired, and by means of the mechanism hereinafter more fully described, the lower open end of the discharge tube $e$ of the receptacle is opened, and the excess commodity will escape therefrom until the exact weight remains in the receptacle E, whereupon the lower open end of the discharge tube is automatically closed. When the excess quantity is poured in the receptacle E, the supporting branch of the beam descends and when such excess is discharged therefrom the receptacle automatically ascends. Now, before the commodity is placed in the pan the ends of the beams will be in balance if the weights H and $h$ are at the ends of the graduated bars, farthest from the fulcrum of the beam. If weight H is then moved toward the fulcrum of the beam to indicate one pound, and then more than one pound of the commodity is poured into receptacle E, the receptacle and the end of the beam supporting it will descend to the limit of their downward movement. Now, if the discharge tube of the pan is opened the receptacle and end of the beam supporting it will not rise upward so as to automatically close said receptacle until the discharge therefrom equals the difference between the leverage resulting from the adjustment of the weight H in its extreme left hand position and the position to which it is adjusted to indicate one pound. The same principle of operation applies to the manipulation of either weight H or weight $h$, whether the weights are adjusted to indicate one pound or more.

In order to accomplish the operation of my improvements in the manner hereinbefore explained, the lower open end of the discharge tube $e$ of the receptacle is adapted to be closed by a cut-off 2, consisting of a segmental plate having up-turned lugs 3 that are pivoted to the sides of the discharge-tube, which latter, below the beam is, preferably, made rectangular in cross-section. At one side of the discharge tube, the lug 3 of said cut-off is provided with an integral arm 4, which extends in a horizontally inclined direction, and has a weight 5 on its extremity, and the opposite lug 3 of the cut-off has an integral arm 6 extending downwardly therefrom at about an angle of thirty-five (35) degrees, say, to arm 4. The extremity of this arm 6 is, preferably, bent at right angles to the remainder of its length to present a flattened edge, which will, when said arm 6 is grasped and the cut-off is swung upward into the position, shown in Fig. 3 of the drawings, catch upon the hook-shaped lower extremity of an arm 7 depending from a horizontally disposed trip 8. This trip 8 is fulcrumed at a point farther from the pivot of the cut-off than arm 7 to the lower downturned extremity of a bracket 9, which latter is made integral with and projects from the central portion of yoke $d$, and this trip extends longitudinally in a plane parallel to that of the beam toward the standard a short distance beyond the opposite side of discharge-tube $e$. The end of the trip farthest from the standard extends but a short distance beyond its pivot, and is provided with a suitable weight that normally keeps it in a horizontal position, above which it is prevented from moving by engaging a set-screw 10 carried by bracket 9. Now, the end of trip 8 nearest the standard is, preferably, stepped and is engaged by the downturned pointed extremity of a stationary arm 11, that extends toward the standard and has its opposite end, preferably, secured to the standard A, in any suitable manner. Before the commodity to be weighed is thrown into the pan E, cut-off 2 is shut, as shown in Fig. 4 of the drawings, so as to close the lower end of the discharge-tube $e$, and when a sufficient quantity has been placed in said pan, it will move to the lower limit of its movement. If cut-off 2 now be moved, by the operator, into the position shown in Fig. 3 of the drawings, the extremity of arm 6 will be engaged and caught by the lower hooked end of arm 7 of trip 8 and retained in such position, until a sufficient quantity of the commodity has been discharged from the pan to reduce the same to the exact weight desired. When this weight is obtained the adjacent branch of the beam and the receptacle supported thereby will immediately move upward and arm 11 will depress the engaging branch of trip 8 and withdraw the hooked arm 7 from under the extremity of arm 6 of the cut-off, which latter, being released, will automatically, by virtue of the weighted arm 4, move into the position shown in Fig. 4 of the drawings, and cut-off the further discharge of the commodity from the receptacle. After all the weighing has been completed, the surplusage of commodity remaining in the pan E or its discharge tube $e$ may readily be removed by raising arm 6 and opening the cut-off so that this final load will be emptied out into a scoop or other suitable receptacle held below the same.

When beans or coffee, or commodities of a coarse granular character are being weighed there is some danger of the cut-off, as it closes, being held partly open by some of the coffee beans, or grains wedging between the advancing edge of the cut-off and the right hand edge of the discharge opening. I obviate this possibility by cutting away the lower edge of the right hand side of the discharge tube of the receptacle, substantially as shown at $x$, in the drawings.

In view of the fact that it may be necessary to make allowance for the difference in friction of the movable elements in each scale embodying the foregoing improvements, and to allow for the time consumed by the shut-off when closing the discharge-opening of the pan, I have provided compensating devices that consist simply of a graduated bar 12, that is supported at about its center of length on the upper end of a peg 13, which latter is removably inserted in a hole in the top of the weight c. Both the peg 13, and the hole are rectangular in cross-section, and thus the bar 12 can be always held in a longitudinal position parallel to the beam. Bar 12 has an adjustable weight 14 mounted thereon and by adjusting this weight just the proper distance, the correct balance of the two arms of the beam can be obtained to a nicety when the scales are in operation, and, when the scales are not being used, and bar 12 and weight 14 are removed the beam will balance.

The normal position of the shut-off 2 is closed. In this position, it is not always apparent to the operator whether there is more than enough of the commodity in the hopper or not. As heretobefore stated, there must be more than enough and in order to make it known to the operator, at a glance, whether the pan is so loaded, I have provided an upright frame 15, on the end of a bracket 16 projecting from the standard A, which has one end of an indicator arm 17 pivoted thereto. The pointed end of this arm points to the graduations on the upper segmental portion of an upright member 18, likewise supported on bracket 16, and when the adjacent branch of the beam is at the limit of its downward movement (which indicates the receptacle is empty) this arm rests upon a finger 19 projecting from frame 15, and points to the lower graduation on member 18, and when the beam is up it points to the upper graduation. In order to raise the arm 17 to its uppermost position to indicate that the receptacle is loaded, I provide weight c with a laterally projecting finger 20, which latter extends laterally into a vertically elongated slot 21 in frame 15, and which, when the adjacent end of the beam and weight c moves upward engages and raises arm 17. When the weight moves downward arm 17 settles to its normal horizontal position, as shown in Fig. 2 of the drawings.

In order to keep the pan in the position shown in Fig. 1 of the drawings, and to prevent it from turning on the trunnions of the yoke in which it is seated, I have pivotally connected the lower portion of the discharge tube of the pan by a connecting rod 30, which extends from said discharge tube longitudinally through the open framework of the standard where it is pivotally connected to a lug 31, projecting from said standard, substantially as shown. This connecting rod allows the pan to move up and down with the pan and yet always keeps it in a perfectly vertical position.

What I claim as new is:

1. A weighing machine comprising a balance-beam fulcrumed between its ends, one branch of which is provided with a permanent weight, a pan having a discharge opening supported by the other branch in which the commodity to be weighed is placed, a closure for said opening and devices for automatically closing the same when the pan is in its raised position, and an adjustable weight supported by the branch of the beam that supports the pan, which is adjustable toward and from the fulcrumnal axis of the beam.

2. Weighing mechanism comprising a balance-beam fulcrumed at a suitable point between its ends and one branch of which is provided with a permanent weight, a receiving pan supported by the other branch having a suitable opening in its bottom, a closure for said opening and devices for closing the same when the pan is in its upper position.

3. Weighing mechanism comprising a balance-beam fulcrumed between its ends one branch of which is provided with a permanent weight, a receiving pan supported by the other branch and having a discharge opening in its bottom, a closure for said discharge opening which is adapted to be opened during the weighing of the commodity and devices for automatically closing said closure when the pan is in its raised position.

4. Weighing mechanism comprising a balance-beam fulcrumed between its ends one branch of which is provided with a permanent weight, a receiving pan supported by the other branch having a discharge opening in its bottom, a closure for said discharge opening, which is adapted to be opened during the weighing of the commodity, devices that automatically close said closure when the pan is in its raised position, and a stationary element independent of said beam and adapted to engage said devices.

5. Weighing mechanism comprising a balance-beam fulcrumed between its ends, a receiving pan supported by one of the branches thereof having a discharge opening in its bottom, a closure plate pivotally connected to said pan for opening and closing said discharge opening, means for locking said plate in an open position that is tripped and releases said plate when the pan is in a raised position, and a stationary element that is adapted to engage and actuate said tripping device when said pan is in a raised position.

6. Weighing mechanism comprising a balance-beam fulcrumed between its ends, a pan supported by one branch of said beam which has a discharge opening in its bottom, a suitable cut-off automatically adapted to keep said opening closed, a suitable tripping mechanism adapted to hold said cut-off in an open position during the weighing of the commodity, and a stationary element that engages said tripping mechanism, and causes the latter to release said cut-off when the weighing operation has been completed.

7. A weighing machine comprising a balance-beam fulcrumed between its ends, a pan supported by one branch thereof having a discharge tube depending therefrom that has an opening in its lower end, a cut-off comprising a plate having up-turned lugs pivoted to said discharge tube, an arm projecting from said plate, a trip comprising an arm hinged to said beam and having a hook-shaped member that is adapted to be engaged by the arm of said cut-off, and a stationary element that depresses the movable end of said trip during the upward movement of the pan and releases said cut-off.

8. A weighing machine comprising a balance-beam fulcrumed between its ends, a pan supported by one branch thereof having a discharge tube depending therefrom that has an opening in its lower end, a cut-off comprising a plate having upturned lugs pivoted to said discharge tube, a weight connected to said cut-off to keep it normally closed, an arm projecting from said plate, a trip comprising a counterbalance arm hinged to said beam and having a hook-shaped member that is adapted to be engaged by the arm of said cut-off, and a stationary element independent of said beam that depresses the movable end of said trip during the upward movement of the pan and releases said cut-off.

9. A weighing machine comprising a balance-beam fulcrumed between its ends, a pan supported by one branch thereof having a discharge tube depending therefrom that has an opening in its lower end, a cut-off comprising a plate having upturned lugs pivoted to said discharge tube, a weight connected to said cut-off and adapted to keep it normally closed, an arm projecting from said plate, a trip comprising a counterbalance arm hinged to said beam having a hook-shaped member that is adapted to be engaged by the arm of said cut-off, and a stationary element independent of said beam that depresses the movable end of said trip during the upward movement of the pan and releases said cut-off.

10. A weighing mechanism comprising a beam fulcrumed between its ends, one of the branches of which is provided with a permanent weight and the other branch of which has its extremity bifurcated, a yoke having trunnions journaled in the extremities of the bifurcations, a pan having a discharge opening and which is adapted to be seated in said yoke, means for closing said opening that automatically operates when the pan is in its raised position, a longitudinally disposed graduated bar supported by the branch of the beam supporting said pan and a slidable weight mounted thereon adapted to normally balance the opposite weighted arm of the beam when the end of the bar is farthest from the fulcrum of said beam.

11. Weighing mechanism comprising a beam fulcrumed between its ends, a receiving pan supported by one of the branches thereof and having a discharge opening, means for closing said discharge opening and devices for holding said means open when the discharge from the pan is taking place, a weight on the branch of the beam opposite that supporting said pan, a longitudinally disposed horizontal graduated bar supported by said last-mentioned branch and a slidable weight adjusted longitudinally on said graduated bar.

12. Weighing mechanism comprising a balance-beam fulcrumed between its ends, a pan on one branch of said beam and having a discharge opening, and closure means for said discharge opening, a weight mounted on the branch of the beam opposite said pan, and an index-finger adapted to be raised and lowered by the movements of said weight.

13. Weighing mechanism comprising a beam fulcrumed between its ends, a pan on one of the branches of said beam and having a discharge opening, closure means for said discharge opening, a weight on the branch of said beam opposite the pan, a longitudinally disposed horizontal graduated bar supported by said weight, a slidable weight mounted on said bar, and an index-finger adapted to be raised and lowered by the movements of said weight.

In witness whereof I have hereunto set my hand this 29th day of May, 1912.

PETRONELLA EDTBAUER.

Witnesses:
FRANK D. THOMASON,
E. K. LUNDY.